Aug. 6, 1935.  W. S. FOUTCH, JR  2,010,182
APPARATUS FOR BREAD MANUFACTURE
Filed Aug. 7, 1933
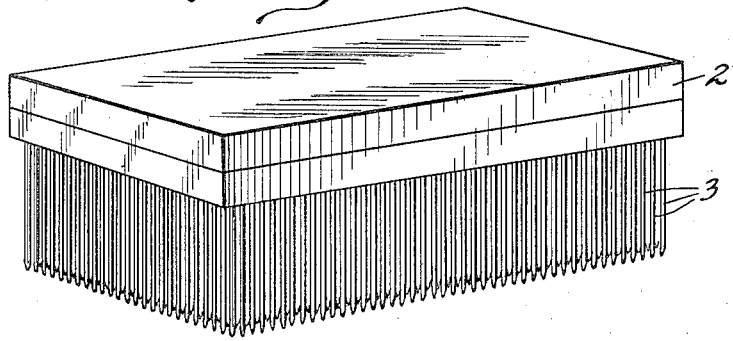
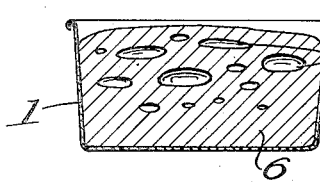
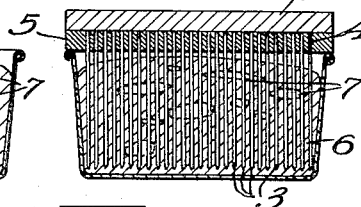
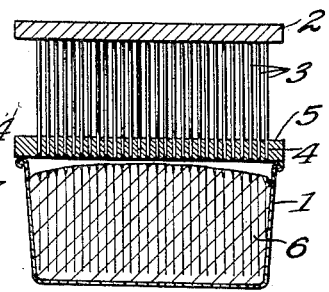
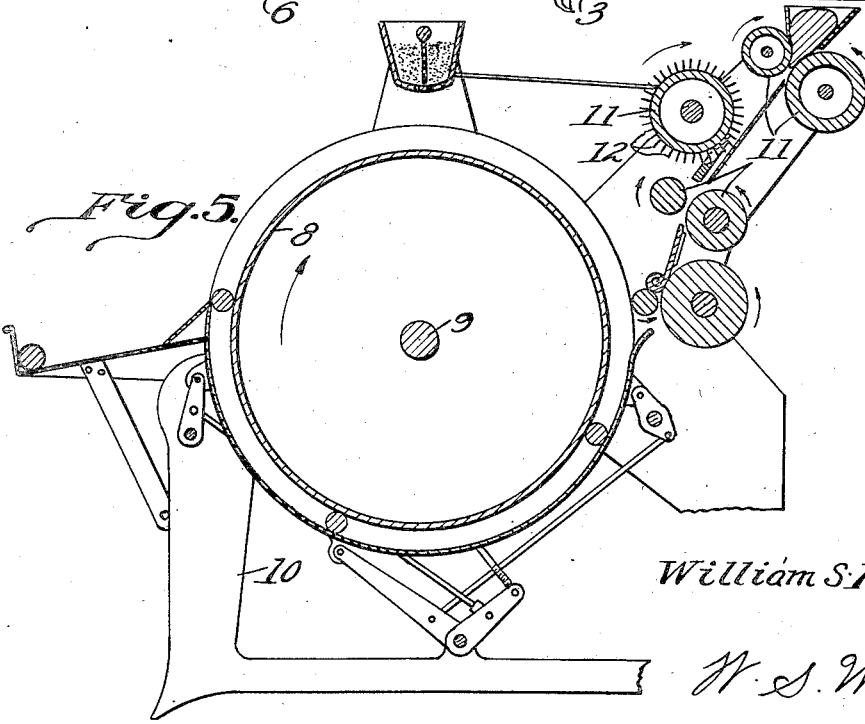
Inventor
William S. Foutch Jr.
W. S. McDowell
Attorney Patented Aug. 6, 1935

2,010,182

UNITED STATES PATENT OFFICE 2,010,182

APPARATUS FOR BREAD MANUFACTURE

William S. Foutch, Jr., Columbus, Ohio

Application August 7, 1933, Serial No. 683,984

1 Claim. (Cl. 107—9)

This invention relates to improvements in the art of bread making and has particular reference to an improved method and apparatus for producing yeast raised baked bread characterized by its uniform texture and absence of holes or voids produced through gas expansion during the manufacture of such breads.

Commercial bakeries have been faced with the problem of avoiding the formation of objectionable gas-produced voids in baked bread for many years. Purchasers of bread object particularly to the presence of these cells or voids in the bread when the latter is sliced for table use. Very little progress has been made in this direction in the avoidance of the objection noted, except to exercise care in the selection of the bread ingredients, to fully mix or knead the same and to avoid excessive use of the gas-producing ingredients. I have discovered that this objection can be substantially eliminated by the provision of a method of treating yeast-raised bread, prior to baking, to release the entrapped gas to the atmosphere so that the bread when baked will possess the desired uniform texture and freedom from gas voids.

For a further understanding of the invention, reference is to be had to the following description and the accompanying drawing, wherein:

Fig. 1 is a perspective view of apparatus which may be used in carrying out the present invention;

Fig. 2 is a vertical transverse sectional view taken through a bread pan;

Fig. 3 is a similar view disclosing the gas releasing means employed in connection with the pan;

Fig. 4 discloses the apparatus when withdrawn from the bread dough;

Fig. 5 is a diagrammatic view of a molding machine provided with perforating means for carrying out the present invention in connection with a machine of this character.

Referring to Fig. 2 of the drawing, the numeral 1 designates a pan, mold or other holder for yeast raised bread. The term bread in this connection is intended to designate an article of food made from flour by moistening, kneading and baking. Previous to baking, the dough is treated in the customary manner to render it light and porous, as by mixing it with yeast. The yeast sets up fermentation, giving off carbon dioxide, which inflates or raises the dough. The same gas may be generated by the interaction of the acid and the carbonate in baking powder, but bread, whether raised by yeast or baking powder often contains the gas cells or voids which localize in different portions of the bread and produce the undesired enlarged holes which the present invention aims to eliminate. I have found that this object can be accomplished inexpensively and with certainty by perforating the raised bread dough prior to baking, so that the perforations or passages produced in the dough permit the gas, which tends to collect in large cells, to be discharged to the atmosphere, thus enabling the bread when baked to possess the desired homogeneous texture which purchasers demand.

The dough may be perforated, as aforesaid, by the employment of several different types of apparatus, depending upon the capacity or output of a given bakery. For instance, in small bakeries, I have employed a holder 2 to which is attached a plurality of spaced, parallel needles 3, arranged in relatively close order. These needles are slidably received in openings 4 provided in a stripping board 5 which, as shown in Fig. 3, is placed over the upper edge of the pan or mold 1. By forcing the needles 3 into the yeast-raised dough, indicated at 6, in Figs. 2 to 4, the dough is perforated or punctured by the needles passing therethrough so that the gas cells, as indicated at 7 in Fig. 3, communicate with the atmosphere, enabling the normally trapped gases contained in such cells to find vent to the atmosphere. Since this localized gas pressure is then reduced or removed, the cells collapse to normal proportions so that the dough after the baking operation will form bread of desired uniform texture. The stripping board 5 is used so that when the holder 2 and its associated needles 3 are withdrawn, as indicated in Fig. 4, the dough will be confined in the pan or mold 1 and prevented from accumulating on the sides of the needles.

In Fig. 5, my invention has been shown as applied to what is known as a molding machine of a type widely used in large commercial bakeries having high daily production schedules. Such molding machines comprise a drum 8 mounted for rotation about an axis 9 provided in connection with a frame 10. The bread dough is passed through rollers 11 and reduced to a strip formation, and these strips are brought into contact with a revolving drum which shapes the dough into a desired form permitting it to be inserted in suitable receptacles for transference to a baking oven. In accordance with my invention, one of the rollers 11 may be provided with radiating needles 12 which penetrate the dough to release the entrapped gas substantially after the manner set forth in the previously described form of the invention.

By the present invention, I am enabled to overcome one of the outstanding objections in the manufacture of bread. This objection has been one of long duration and so far as I am aware, it has never been satisfactorily solved prior to my present invention.

What is claimed is:

In a bread molding machine, a frame, coiling means mounted thereon, feed rollers located adjacent said coiling means and operative to feed yeast raised bread dough in strip form to said coiling means, a rotary holder carrying pointed needles on its periphery and mounted adjacent to said feed rollers and operable to penetrate and degasify the entire mass of said bread dough before coiling.

WILLIAM S. FOUTCH, Jr.